United States Patent [19]

Watkins et al.

[11] Patent Number: 4,987,883
[45] Date of Patent: Jan. 29, 1991

[54] EVACUATED SOLAR COLLECTOR TUBE

[76] Inventors: Albert W. Watkins, 15285 Monte Rosa Dr., Granger, Ind. 46530; Ivan W. Watkins, 16782 269th St., Cold Spring, Minn. 56320

[21] Appl. No.: 258,139
[22] Filed: Oct. 14, 1988
[51] Int. Cl.$^5$ ................................................ F24J 2/24
[52] U.S. Cl. ..................................................... 126/443
[58] Field of Search ............... 126/448, 442, 443, 450; 138/38, 39, 114; 165/178

[56] References Cited

U.S. PATENT DOCUMENTS

| | | | |
|---|---|---|---|
| 1,946,184 | 2/1934 | Abbot | 126/424 |
| 4,326,503 | 4/1982 | Geier et al. | 126/443 |
| 4,409,964 | 10/1983 | Shimada et al. | 126/443 |

Primary Examiner—James C. Yeung

[57] ABSTRACT

The present invention has two tubes arranged concentrically and separated by a vacuum. The internal tube is of thin wall steel construction with a selective absorbing coating. The external tube is a hard glass material such as, for example, Pyrex. The vacuum tight seal between the concentric tubes consists of an accordian-pleated semi-rigid material such as copper connected to the inner tube. The semi-rigid material is then fused to a thermally insulating, vacuum tight spacer. Finally, the spacer is fused to the outer glass tube. Additional shatter protection may be derived from a reflective coating extending from midway along the ceramic spacer over the ceramic-glass seal, and along the glass for several inches.

7 Claims, 1 Drawing Sheet

EVACUATED SOLAR COLLECTOR TUBE

BACKGROUND OF THE INVENTION

The present invention relates to solar energy collectors in general, and specifically to concentric tube heat exchangers.

Prior art evacuated tube collectors have faced numerous difficulties, the most significant of which is cost. In order to collect a substantial amount of energy per linear foot of concentric vacuum separated tubing, concentrating reflectors or lenses have been employed in conjunction with the vacuum tubes. However, such concentrating devices introduce new and very substantial problems. Unequal linear heating of opposing sides of the tubes results in warpage. High temperatures gained through concentration result in large temperature differences between the concentric tubes and therefore large difference in linear expansion. High temperature differences and rapid temperature rises also produce thermal shock which can shatter glass tubes. Each of these problems has been solved or attempted in previous patents which are too numerous to mention. It is an objective of the present invention to overcome all of the above discussed limitations and other, while introducing few new limitations.

SUMMARY OF THE PRESENT INVENTION

The preferred embodiment of the present invention has two tubes arranged concentrically and separated by a vacuum. The internal tube is preferred to be of thin wall steel construction with a selective absorbing coating. The external tube is a hard glass material such as, for example, Pyrex. The vacuum tight seal between the concentric tubes consists of an accordian-pleated semi-rigid material such as copper connected to the inner tube. The semi-rigid material is then fused to a thermally insulating, vacuum tight spacer. Finally, the spacer is fused to the outer glass tube. Additional shatter protection may be derived from a reflective coating extending from midway along the ceramic spacer over the ceramic-glass seal, and along the glass for several inches.

DETAILED DESCRIPTION OF THE INVENTION

Figure 1:
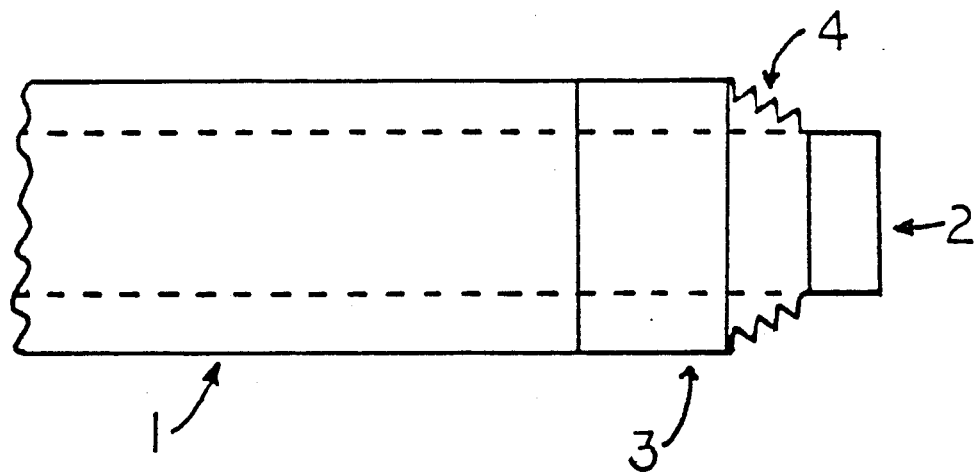
FIG. 1 shows the preferred embodiment of the present invention.

Referring to FIG. 1, outer transparent tube 1 provides the main window through which solar radiation is allowed to pass. Tube 1 also acts as a thermal barrier, preventing infra-red radiation from escaping from the collector system. Finally, tube 1 acts as a vacuum barrier, preventing influx of air which would otherwise contaminate the vacuum system described hereinbelow. Tube 1 may be preferably a pyrex or other similar hard glass material. Inserted concentrically within outer tube 1 is inner tube 2. Inner tube 2 in the preferred embodiment is made of thin wall steel, and could be coated with a prior art selective absorber such as chromium dioxide to improve the absorption of solar energy. Tube 2 performs the functions of converting solar radiation to thermal energy, retaining some energy transfer fluid within tube 2, transfering any thermal energy produced through conversion of solar radiation to the transfer fluid, and contributing to the retention of a vacuum. As previously mentioned, there is a vacuum generated between tubes 1 and 2. The vacuum provides excellent thermal insulation, much as would be found in a common lunch box type vacuum bottle. Semi-rigid support 4 is fashioned from a semi-rigid material such as copper, and performs the functions of vacuum retention, flexibility—so as to absorb any forces which might otherwise be created between tubes 1 and 4 by differing thermal expansion, and, to some extent, cushioning against mechanical shock. Finally, spacer 3 in the preferred embodiment is an aluminum oxide tube of diameter equal to that of tube 1, and of relatively small length. The function of spacer 3 is to provide a thermal barrier between inner tube 2 and outer tube 1. This thermal barrier protects outer tube 1 from rapid thermal cycling which might otherwise destroy it. As should now be apparent, spacer 3 must also perform the function of retaining a vacuum. Each of the seals which interconnect elements 1-4 are standard types of vacuum tight nature and are readily produced through prior art techniques. The foregoing description of the preferred embodiment is in no way intended to limit the breadth of the invention. Changes or variations which are within the scope of one of ordinary skill in the art are considered to be encompassed within the foregoing description.

Having thus described invention, we claim:

1. An evacuated tube solar energy collector and heat exchanger having an outer tube and an inner tube, said inner and said outer tubes substantially separated by a partial vacuum, and a first interconnection means for interconnecting said inner and said outer tubes while maintaining a vacuum tight seal therebetween, wherein said first interconnection means comprises a second portion which is sufficiently resilient to maintain said vacuum tight seal between said inner tube and said outer tube when said inner tube expands and contracts differently from said outer tube, and wherein said first interconnection means comprises a first portion composed primarily of a refractory material which is resistant to thermal shock associated with relatively significantly concentrated solar energy instantaneously impinging upon said collector while simultaneously conducting no significant thermal energy from said inner tube to said outer tube.

2. The evacuated tube solar energy collector of claim 1 wherein said first interconnection means is sufficiently rigid to provide positional support to said outer tube to help maintain said outer tube in a spaced relationship with respect to said inner tube.

3. The evacuated tube solar energy collector of claim 1 wherein said first interconnection means is sufficiently rigid to maintain said outer tube in a spaced relationship with respect to said inner tube.

4. The solar energy collector of claim 1 wherein said outer tube is cylindrical.

5. The solar energy collector of claim 1 wherein said inner tube is cylindrical.

6. The solar energy collector of claim 4 wherein said inner tube is cylindrical.

7. The solar energy collector of claim 6 wherein said inner and said outer tubes are generally concentric.

* * * * *